United States Patent
Wang et al.

(10) Patent No.: US 10,743,239 B2
(45) Date of Patent: Aug. 11, 2020

(54) METHOD AND DEVICE FOR COMMUNICATION BASED ON LAA

(71) Applicant: BEIJING SPREADTRUM HI-TECH COMMUNICATIONS TECHNOLOGY CO., LTD., Beijing (CN)

(72) Inventors: Hualei Wang, Shanghai (CN); Weijie Xu, Shanghai (CN); Zhengang Pan, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/416,418

(22) Filed: Jan. 26, 2017

(65) Prior Publication Data

US 2017/0325156 A1 Nov. 9, 2017

(30) Foreign Application Priority Data

May 9, 2016 (CN) .......................... 2016 1 0302673

(51) Int. Cl.
*H04W 48/12* (2009.01)
*H04L 1/18* (2006.01)
(Continued)

(52) U.S. Cl.
CPC .......... *H04W 48/12* (2013.01); *H04L 1/1864* (2013.01); *H04W 16/14* (2013.01);
(Continued)

(58) Field of Classification Search
CPC . H04W 48/12; H04W 16/14; H04W 72/0413; H04W 72/042; H04W 72/1268; H04L 1/1864
(Continued)

(56) References Cited

U.S. PATENT DOCUMENTS

2010/0214938 A1 8/2010 Chen et al.
2012/0033627 A1* 2/2012 Li .......................... H04L 5/0007
370/329

(Continued)

FOREIGN PATENT DOCUMENTS

CN 101478808 A 7/2009
CN 105207754 A 12/2015
(Continued)

OTHER PUBLICATIONS

Summary of the First CN Office Action corresponding to Application No. 201610302673.1; dated May 4, 2018.

*Primary Examiner* — Natasha W Cosme
(74) *Attorney, Agent, or Firm* — Cantor Colburn LLP

(57) ABSTRACT

A method and a device for communication based on LAA, the method for communication includes: transmitting cell group information to a terminal, where the cell group information points to multiple carriers, and the multiple carriers comprise an un-licensed carrier and a licensed carrier; and transmitting downlink control information through an activated carrier in the multiple carriers, where the cell group information is used to instruct the terminal to implement a blind detection to the multiple carriers so as to obtain the downlink control information. Technical solutions of the present disclosures can improve communication speed and efficiency of a LAA system.

18 Claims, 2 Drawing Sheets

(51) Int. Cl.
*H04W 16/14* (2009.01)
*H04W 72/04* (2009.01)
*H04W 72/12* (2009.01)

(52) U.S. Cl.
CPC ..... *H04W 72/042* (2013.01); *H04W 72/0413* (2013.01); *H04W 72/1268* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 2016/0135143 | A1* | 5/2016 | Won | H04W 72/005 370/312 |
| 2017/0005768 | A1* | 1/2017 | Yin | H04L 5/0055 |
| 2017/0195888 | A1 | 7/2017 | Gou et al. | |
| 2017/0353912 | A1* | 12/2017 | Einhaus | H04W 48/12 |

FOREIGN PATENT DOCUMENTS

| | | |
|---|---|---|
| CN | 105338568 A | 2/2016 |
| CN | 105471564 A | 4/2016 |

\* cited by examiner

METHOD AND DEVICE FOR COMMUNICATION BASED ON LAA

CROSS-REFERENCE TO RELATED APPLICATIONS

This application claims the benefit of priority to Chinese Patent Application No. 201610302673.1, filed on May 9, 2016, and entitled "METHOD AND DEVICE FOR COMMUNICATION BASED ON LAA", and the entire disclosure of which is incorporated herein by reference.

TECHNICAL FIELD

The present disclosure generally relates to wireless communication technical field, and more particularly, to a method and a device for communication based on LAA.

BACKGROUND

In recent years, with popularization of mobile devices and sharp increasing of mobile data flow and wired network data flow, a network capacity pressure of an operator surges. However, frequency spectrum resources are in shortage; and in licensed frequency bands, especially expensive low frequency-band resources, not only a frequency channel available is limited, but also are consumed by rapidly increased user group. In world-wide, 5 GHz license-free frequency bands still have quite a part available frequency spectrum, and operators and equipment manufactures seek to use un-licensed frequency spectrums to enhance network capacities. Accordingly, LAA (License Assisted Access) technology, also known as licensed frequency band assisted license-free frequency spectrum access technology, emerges. The LAA technology uses license-free frequency band to carry data flow of mobile service, so as to enlarge the network capacity.

In existing technologies, whereas the LAA takes a licensed frequency band based on a network architecture of a carrier aggregation as a PCell (Primary Cell) to provide a reliable control signal to guarantee a mobility and meet requirements of QoS (Quality of Service) of the real-time data service, the license-free frequency band serves as a SCell (Secondary Cell) mainly to meet requirements of best effort and support a full-downlink or an uplink and downlink transmission. The LAA applies a cross carrier scheduling and a self-scheduling of a conventional CA (Carrier Aggregation) to realize scheduling. That is to say, a UE (User Equipment) receives DCI (Downlink Control Information) on a carrier appointed by the scheduling according to network scheduling information. The existing technologies inform the UE about carrier information mainly by pre-configuring a scheduling via applying an eNB (Evolved Node B).

However, if the above recited way of scheduling is applied to a un-licensed frequency spectrum, when a base station senses a carrier of the pre-configured scheduling and finds out that the carrier can not be used currently, the scheduling, the sensing and transmitting of information will be implemented again, which further delays the UE for receiving the information. In particularly, for an uplink HARQ (Hybrid Auto Repeat Request), with above described way, a much longer delay will be brought, which will cause low efficiency and bad user experience.

SUMMARY

Embodiments of the present disclosure provide a method for improving a communication speed and an efficiency of a LAA (License Assisted Access) system.

The present disclosure provides a method for communication based on LAA. The method for communication based on LAA includes: transmitting cell group information to a terminal, where the cell group information points to multiple carriers, and the multiple carriers include an un-licensed carrier and a licensed carrier; and transmitting downlink control information through an activated carrier in the multiple carriers, where the cell group information is used to instruct the terminal to implement a blind detection to the multiple carriers so as to obtain the downlink control information.

In some embodiments, transmitting downlink control information through an activated carrier in the multiple carriers includes: continuously sensing the un-licensed carrier; and when the un-licensed carrier is sensed being idle, transmitting the downlink control information through the un-licensed carrier.

In some embodiments, the downlink control information includes carrier indication information and new data indication information; and the carrier indication information includes two carrier indexes which respectively point to a carrier corresponding to uplink HARQ (Hybrid Auto Repeat Request) feedback and a carrier of uplink scheduling.

In some embodiments, the terminal implementing a blind detection to the multiple carriers so as to obtain the downlink control information includes: determining a carrier applied by the terminal for transmitting uplink data previously; and the terminal implementing a carrier detection to the carrier being determined, so as to obtain the downlink control information.

In some embodiments, the terminal implementing a blind detection to the multiple carriers so as to obtain the downlink control information further includes: when the downlink control information is not obtained after a preset period of time, the terminal implementing the carrier detection to other carriers other than the carrier being determined.

In some embodiments, the cell group information instructs the terminal to implement the blind detection to the multiple carriers through a preset information element or preset instruction information included in the cell group information.

In some embodiments, the cell group information is transmitted by one or more of following ways: RRC (Radio Resource Control) signaling and a control element of a MAC (Media Access Control).

The present disclosure further provides another method for communication based on LAA. The method for communication based on LAA includes: receiving cell group information from a base station, where the cell group information points to multiple carriers, and the multiple carriers include an un-licensed carrier and a licensed carrier; and implementing a blind detection to the multiple carriers based on the cell group information so as to obtain downlink control information.

In some embodiments, implementing a blind detection to the multiple carriers based on the cell group information so as to obtain downlink control information includes: determining a carrier applied by the terminal for transmitting uplink data previously; and implementing a carrier detection to the carrier being determined, so as to obtain the downlink control information.

In some embodiments, implementing a blind detection to the multiple carriers so as to obtain the downlink control information further includes: when the downlink control information is not obtained after a preset period of time, implementing the carrier detection to other carriers other than the carrier being determined.

In some embodiments, the downlink control information includes carrier indication information and new data indication information; the carrier indication information includes two carrier indexes which respectively point to a carrier corresponding to uplink HARQ feedback and a carrier of uplink scheduling; and implementing a carrier detection to the carrier being determined, so as to obtain the downlink control information further includes: when the new data indication information is not reversed, re-transmitting the data through a carrier of an uplink scheduling; and when the new data indication information is reversed, transmitting new data through the carrier of the uplink scheduling.

In some embodiments, the cell group information is transmitted by one or more of following ways: RRC signaling and a control element of a MAC.

The present disclosure further provides a device for communication based on LAA. The device for communication based on LAA includes: a cell group information transmitting circuitry configured to: transmit cell group information to a terminal, wherein the cell group information points to multiple carriers, and the multiple carriers include an un-licensed carrier and a licensed carrier; and a downlink control information transmitting circuitry configured to: transmit downlink control information through an activated carrier in the multiple carriers, wherein the cell group information is used to instruct the terminal to implement a blind detection to the multiple carriers so as to obtain the downlink control information.

In some embodiments, the downlink control information transmitting circuitry includes: a sensing sub-circuitry configured to: continuously sense the un-licensed carrier; and a transmitting sub-circuitry configured to: when the un-licensed carrier is sensed being idle, transmit the downlink control information through the un-licensed carrier.

In some embodiments, the downlink control information includes carrier indication information and new data indication information; and the carrier indication information includes two carrier indexes which respectively point to a carrier corresponding to uplink HARQ feedback and a carrier of uplink scheduling.

In some embodiments, the cell group information instructs the terminal to implement the blind detection to the multiple carriers through a preset information element or preset instruction information included in the cell group information.

In some embodiments, the cell group information is transmitted by one or more of following ways: RRC signaling and a control element of a MAC.

The present disclosure further provides another device for communication based on LAA. The device for communication based on LAA includes: a receiving circuitry configured to: receive cell group information from a base station, wherein the cell group information points to multiple carriers, and the multiple carriers include an un-licensed carrier and a licensed carrier; and a blind detecting circuitry configured to: implement a blind detection to the multiple carriers based on the cell group information so as to obtain downlink control information.

In some embodiments, the blind detecting circuitry includes: a determining sub-circuitry configured to: determine a carrier applied by the terminal for transmitting uplink data previously; and a detecting sub-circuitry configured to: implement a carrier detection to the carrier being determined, so as to obtain the downlink control information.

In some embodiments, when the downlink control information is not obtained after a preset period of time, the detecting sub-circuitry implements the carrier detection to other carriers other than the carrier being determined.

In some embodiments, the downlink control information includes carrier indication information and new data indication information; the carrier indication information includes two carrier indexes which respectively point to a carrier corresponding to uplink HARQ feedback and a carrier of uplink scheduling; and the device for communication based on LAA further includes: a data transmitting circuitry configured to: when the new data indication information is not reversed, re-transmit the data through a carrier of an uplink scheduling; and when the new data indication information is reversed, transmit new data through the carrier of the uplink scheduling.

In some embodiments, the cell group information is transmitted by one or more of: RRC signaling and a control element of a MAC.

In comparison with exiting technologies, the technical solution according to embodiment of the present disclosure possess following advantages:

In the present disclosure, cell group information is transmitted to a terminal, the cell group information points to multiple carriers which include an un-licensed carrier and a licensed carrier; and downlink control information is transmitted through an activated carrier in the multiple carriers. Accordingly, all activated carriers in a LAA system can transmit the downlink control information to UE (User Equipment), which reduces a time delay of transmission. Moreover, the UE can implement blind detection to the multiple carriers without a network scheduling, so that the downlink control information can be received rapidly, and a speed and an efficiency of a communication between base station and UE are improved.

Further, the cell group information instructs the terminal to implement a blind detection to the multiple carriers through a preset information element or a preset indication information included in the cell group information, which realizes the cooperation between the base station and the terminal, that the terminal can rapidly receive the downlink control information under condition that there is no need for a network scheduling, and that the speed and the efficiency of the communication between base station and UE can be further improved.

DETAILED DESCRIPTION

As described in the background, if an existing way of scheduling is applied to the un-licensed frequency spectrum, under circumstance that a channel transmission resource can not be obtained by sensing a carrier of the pre-configured scheduling, it will be delayed for the UE receiving the information, in particularly, for an uplink HARQ (Hybrid Auto Repeat Request), the time delay will be much longer, which will cause low efficiency and bad user experience.

Embodiment of the present disclosure uses an opportunity transmission property brought by a sensing mechanism of LBT (Listen Before Talk) in LAA (License Assisted Access), so that an un-licensed carrier cell have an opportunity to transmit information, and a terminal can actively implement a blind detection to a carrier to obtain downlink control information without a network scheduling. Therefore, time delay will be reduced and the terminal will receive information faster.

In order to make above recited objectives, features and advantages of the present disclosure clear and easy to understand, embodiments of the present disclosure will be illustrated in detailed as follow in combination with corresponding drawings.

Figure 1:
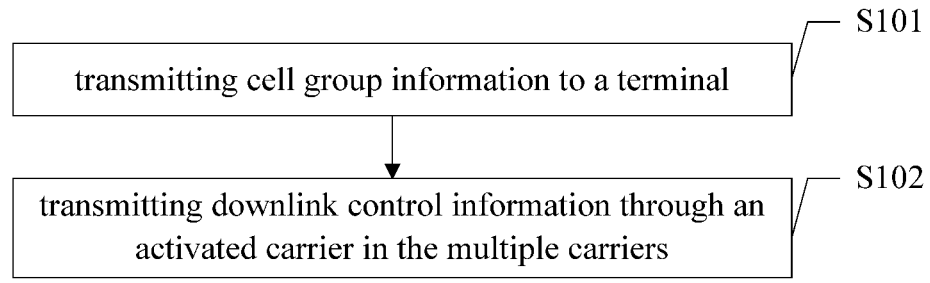
FIG. 1 schematically illustrates a flow chart of a method for communication based on LAA according to one embodiment of the present disclosure.

FIG. 1 is a flow chart of a method for communication based on LAA according to one embodiment of the present disclosure. Specific steps of the method for communication based on LAA will be described in detail as following in combination with FIG. 1.

The method for communication based on LAA as shown in FIG. 1 is applied to a base station side.

In step S101: transmitting cell group information to a terminal.

In some embodiments, the cell group information may point to multiple carriers, and the multiple carriers may include an un-licensed carrier and a licensed carrier. Specifically, the multiple carriers being pointed by the cell group information can aggregate in a common LAA system. The cell group information may indicate that the base station informs the terminal about a carrier applied by the base station for transmitting the downlink control information.

Correspondingly, in some embodiments, the base station may be a licensed carrier base station, or may be an un-licensed carrier base station. In addition, the terminal in the present disclosure is also called UE (User Equipment).

The cell group information may be used to instruct the terminal to implement a blind detection to the multiple carriers, so as to obtain the DCI (Downlink Control Information).

In some embodiments, the cell group information may further include a preset information element or preset instruction information. Specifically, the preset information element may be a system IE (Information Element). The preset instruction information may be pre-added information, such as, information having a size of one bit. If the preset instruction information is 0, then a cross carrier scheduling and a self-scheduling of a conventional CA (Carrier Aggregation) are applied to realize scheduling; and if the preset instruction information is 1, then the terminal is instruct to implement the blind detection to the multiple carriers.

In some embodiments, the cell group information is transmitted by one or more of following ways: RRC (Radio Resource Control) signaling and a CE (Control Element) of a MAC (Media Access Control). Wherein, the RRC signaling refers to radio resource control signaling; and the CE of the MAC refers to the control element resource of the media access control. Specifically, a size of the occupied downlink CE resource may be configured according to a service type.

In some embodiments of the present disclosure, in order to guarantee a stability of the communication, the licensed carrier enjoys a priority for being applied to transmit the cell group information.

In step S102: transmitting downlink control information through an activated carrier in the multiple carriers.

In some embodiments, the base station may activate multiple carriers in the cell group information, and multiple carriers may be driven to a transmitting state. The un-licensed carrier may be used and released by activating and deactivating processes, so as to dynamically use the un-licensed frequency spectrum resource.

Specifically, the carrier in the transmitting state means that the carrier is ready to transmit information at all times. The un-licensed carrier in the transmitting state may be used to transmit the downlink control information, and the licensed carrier can be always in the transmitting state for transmitting the downlink control information.

In step S102, the activated un-licensed carrier enjoys the priority of being applied to transmit the downlink control information. In some embodiments, there is a plurality of un-licensed carriers, and transmitting the downlink control information through the activated carrier in the multiple carriers includes: continuously sensing the plurality of un-licensed carriers; and when a first un-licensed carrier is sensed being idle, transmitting the downlink control information through the first un-licensed carrier, and when the first un-licensed carrier is sensed being occupied, sensing another un-licensed carrier other than the first un-licensed carrier.

Specifically, continuously sensing the un-licensed carrier may be realized by the LBT mechanism.

It should be noted that, the LBT mechanism may be realized by any practical ways, and the present disclosure gives no limitation to this.

Specifically, the downlink control information may include: HARQ (Hybrid Auto Repeat Request) information and scheduling information indicating an uplink transmission, ACK (Acknowledgement)/NACK (Not Acknowledgement) information, RV (Redundancy Version) information, carrier indication information, MCS (Modulation and Coding Scheme) and HARQ process numbers, and NDI (New Data Indicator).

In some embodiments of the present disclosure, the carrier indication information may only include one carrier index, wherein the carrier index not only points to a carrier corresponding to uplink HARQ feedback, but also points to a carrier of uplink scheduling. If a value of the NDI is False, the terminal fails to transmit data through the carrier corresponding the carrier index, and the terminal will re-transmit the data through this carrier; and if a value of the NDI is True, the terminal successfully transmits data through the carrier corresponding the carrier index, and the terminal will transmit new data through this carrier.

In some embodiments of the present disclosure, the carrier indication information may include two carrier indexes which are respectively a carrier index 1 and a carrier index 2. Wherein, the carrier index 1 may point to a carrier corresponding to uplink HARQ feedback, and the carrier index 2 may point to a carrier of uplink scheduling. If the value of the NDI is not reversed, for example, if the value of the NDI is False, the terminal fails to transmit data through the carrier corresponding to the carrier index 1, and the terminal will re-transmit the data through the carrier corresponding to the carrier index 2; and if the value of the NDI is reversed, for example, if the value of the NDI is True, the terminal successfully transmits data through the carrier corresponding to the carrier index 1, and the terminal will transmit new data through the carrier corresponding to the carrier index 2.

In embodiment of the present disclosure, through configuring two carrier indexes in the carrier indication information to point to the carrier corresponding the uplink HARQ feedback and the carrier of uplink scheduling, respectively, a flexibility of a communication between the terminal and the base station is enhanced, a communication delay is reduced, and a communication efficiency is improved.

In embodiments of the present disclosure, the cross carrier scheduling and the self scheduling in the conventional CA are avoided. Further, the present disclosure transmits the downlink control information through the activated carrier in the LAA, so that the downlink control information can be transmitted quickly, and meanwhile the downlink control information is obtained through the blind detection process of the UE, so that time delay is decreased, a communication efficiency is enhanced and a user experience is improved.

Figure 2:
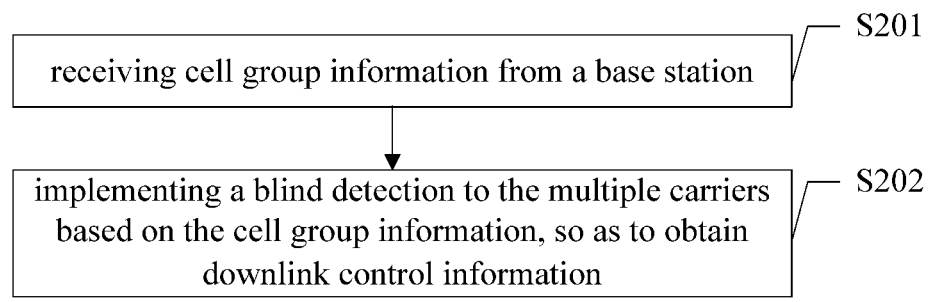
FIG. 2 schematically illustrates a flow chart of a method for communication based on LAA according to another embodiment of the present disclosure.

Referring to FIG. 2, a flow chart of a method for communication based on LAA according to another embodiment of the present disclosure is illustrated.

The method for communication based on LAA as shown in FIG. 2 is applied to a terminal side.

In step S201: receiving cell group information from a base station. Wherein, the cell group information points to multiple carriers which include an un-licensed carrier and a licensed carrier.

In step S202: implementing a blind detection to the multiple carriers based on the cell group information, so as to obtain downlink control information.

Further, in the step S202, the blind detection is implemented to the multiple carriers being pointed by the cell group information based on the received cell group information, so as to obtain the downlink control information.

In some embodiment, in the step S202, a carrier applied by the terminal for transmitting uplink data previously is determined, and a carrier detection is implemented to the carrier being determined, so as to obtain the downlink control information. If the downlink control information is not obtained after a preset period of time, the carrier detection will be implemented to other carriers other than the carrier being determined. That is to say, when the terminal implements the blind detection to the multiple carriers, the blind detection is firstly implement to the carrier applied by the terminal for previously transmitting uplink data, and when the downlink control information is not obtained from this carrier in the preset period of time, then the detection is implemented to other carriers other than this carrier.

It can be understood that, a value of the preset period of time can be adaptively adjusted according to practical application conditions, and the present disclosure gives no limitation to this.

In some embodiments, the cell group information may be received by one or more of the following ways: RRC signaling and a control element of a MAC.

In some embodiments, since the cross carrier scheduling and the self scheduling of the conventional carrier aggregation are avoided, the terminal can not obtain carrier information for transmitting the downlink control information, thus the terminal can implement the blind detection to the multiple carriers to obtain the downlink control information.

Specifically, PDCCH (Physical Downlink Control Channel) carries the downlink control information. In order to determine resource occupied by the PDCCH, resource occupied by PHICH (Physical Hybrid ARQ Indicator Channel) needs to be determined at first. Resource occupied by the PHICH in one sub-frame is related to a sub-frame matching, matching information of uplink and downlink sub-frames is transmitted in broadcasting information of SIB1 (System Information Block), the SIB1 is carried by PDSCH (Physical Downlink Shared Channel), and the PDSCH is scheduled by the PDCCH. That is to say, it needs to obtain the PDCCH information to demodulate the SIB1 so as to obtain information relating to the sub-frame matching. From above, in order to obtain the downlink control information, it needs to implement the blind detection to the PDCCH.

Specifically, the terminal can implement the blind detection in a searching scope determined by a searching space, wherein the searching space includes a common space and a UE-specific space. Different searching spaces correspond to different CCE (Channel Control Element) aggregation grades. Usually, the CCE aggregation grades include four types which restively include one, two, four and eight CCEs. All the CCEs are continuously distributed in the searching space, and one UE may have more than one searching space. The UE implements a blind decoding to any possible PDCCHs.

Specifically, the blind detection implemented by the terminal may include: the UE finding an initial position of the CCE; at the initial position of the CCE, cutting out an estimated DCI length to implement decoding; if a CRC (Cyclic Redundancy Check) of a information bit after the decoding is identical to a CRC carried by the PDCCH, the information bit carried by the current PDCCH is the downlink control information currently transmitted.

In some embodiments, in order to reduce a time delay of the UE blind detection and reduce a spending of the LAA system, carrier amount in the cell group information is limited.

It can be understood that, carrier amount in the cell group information can be adaptively configured and adjusted according to practical application conditions, and the present disclosure gives no limitation to this.

In some embodiments, the downlink control information includes carrier indication information and new data indication information. The carrier indication information includes two carrier indexes, where the two carrier indexes respectively point to the carrier corresponding to the uplink HARQ feedback and the carrier of uplink scheduling. When the new data indication information is not reversed, it means that the terminal fails to transmit data on the carrier corresponding to the uplink HARQ feedback, in this case, the terminal will re-transmit the data on the carrier of the uplink scheduling. When the new data indication information is reversed, it means that the terminal successfully transmits data on the carrier corresponding to the uplink HARQ feedback, in this case, the terminal will transmit new data on the carrier of the uplink scheduling.

Specifically, the carrier indication information includes two carrier indexes which are respectively a carrier index 1 and a carrier index 2. Wherein, the carrier index 1 can point to the carrier corresponding to the uplink HARQ feedback, and the carrier index 2 can point to the carrier of the uplink scheduling. If the value of the NDI is False, the terminal fails to transmit data through the carrier corresponding to the carrier index 1, and the terminal will re-transmit the data through the carrier corresponding to the carrier index 2; and if the value of the NDI is True, the terminal successfully transmits data through the carrier corresponding to the carrier index 1, and the terminal will transmit new data through the carrier corresponding to the carrier index 2.

In embodiment of the present disclosure, for any carrier in the cell group information, the terminal can receive the DCI information transmitted by any of the carriers under condition that there is no network cross carrier scheduling indication, thus time delay of the information receiving process is reduced, and communication efficiency is improved.

Details of the present embodiment can refer to corresponding descriptions in the above recited embodiments, which will not be described herein.

Figure 3:
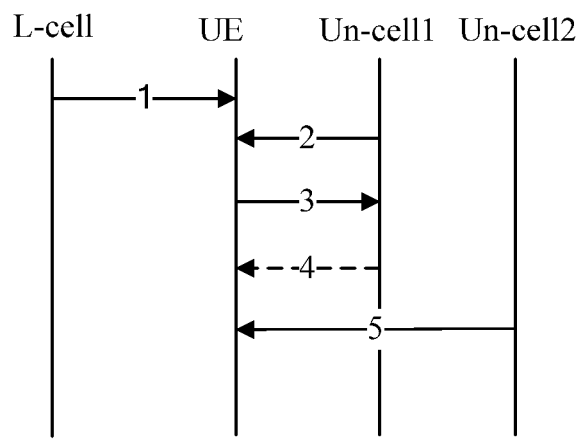
FIG. 3 schematically illustrates a data interaction process of a method for communication based on LAA according to another embodiment of the present disclosure.

FIG. 3 schematically illustrates a data interacting process of the method for communication based on LAA according to one embodiment of the present disclosure. Specific process of the method for communication based on LAA will be described in detail as following in combination with FIG. 3.

As shown in FIG. 3, LAA aggregated carriers include: a licensed carrier L-cell, an un-licensed carrier Un-cell1 and an un-licensed carrier Un-cell2.

Wherein, number 1 indicates that a base station (not shown in FIG. 3) transmits cell group information through the licensed carrier L-cell by way of RRC signaling or a control element of MAC. Further, transmitting the cell group information through the licensed carrier L-cell can guarantee a communication stability. The terminal UE can obtain the cell group information configured through the licensed carrier L-cell. Number 2 indicates that the un-licensed carrier Un-cell transmits uplink grant information to the UE. Number 3 indicates that the UE implements uplink transmission according to the uplink grant information obtained. Number 4 indicates that the UE implements detection to the un-licensed carrier Un-cell1, and the un-licensed carrier Un-cell1 does not receive DCI including ACK/NACK feedback information within 4 ms. Number 5 indicates that the UE obtains the DCI information including ACK/NACK feedback information from the un-licensed carrier Un-cell2 by blind detection. The DCI indicates HARQ information corresponding to the terminal uplink transmission.

In embodiments of the present disclosure, each carrier in the cell group information has an opportunity of transmitting DCI, there is no need of a network scheduling, the UE side can implement the blind detection to any carrier and will limited to implement the blind detection to a specific carrier to obtain the DCI, so that information receiving process of the UE side is accelerated, time delay is reduced, and network efficiency is improved.

It can be understood that, this embodiment is just for exemplary illustration, but not for limitation.

Details of the present embodiment can refer to corresponding descriptions of above recited embodiments, which will not be described again.

Figure 4:
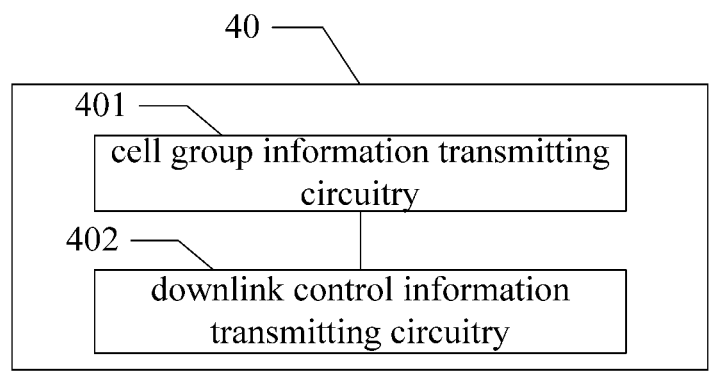
FIG. 4 schematically illustrates a structure of a device for communication based on LAA according to one embodiment of the present disclosure.

FIG. 4 schematically illustrates a structure of a device for communication based on LAA according to one embodiment of the present disclosure. The device for communication based on LAA 40 will be described in detail as following in combination with FIG. 4.

The device for communication based on LAA 40 as shown in FIG. 4 can be used on the base station side. The device for communication based on LAA 40 includes: a cell group information transmitting circuitry 401 and a downlink control information transmitting circuitry 402.

The cell group information transmitting circuitry 401 is configured to transmit cell group information to a terminal, wherein the cell group information points to multiple carriers, and the multiple carriers include an un-licensed carrier and a licensed carrier.

The downlink control information transmitting circuitry 402 is configured to transmit downlink control information through an activated carrier in the multiple carriers, wherein the cell group information is used to instruct the terminal to implement blind detection to the multiple carriers so as to obtain the downlink control information.

In some embodiments, the cell group information can be transmitted by one or more of the following ways: RRC signaling and a control element of a MAC. The cell group information can instruct the terminal to implement blind detection to the multiple carriers through preset information element or present instruction information therein.

Specifically, the downlink control information transmitting circuitry 402 may include: a sensing sub-circuitry (not shown on FIG. 4) and a transmitting sub-circuitry (not shown on FIG. 4).

The sensing sub-circuitry is configured to continuously sense the un-licensed carrier. The transmitting sub-circuitry is configured to transmit the downlink control information through the un-licensed carrier when the un-licensed carrier is sensed being idle. In some embodiments, there is a plurality of un-licensed carriers, and the sensing sub-circuitry is configured to: when a first un-licensed carrier is sensed being occupied, sense an un-licensed carrier other than the first un-licensed carrier.

Details of the present embodiment can refer to corresponding descriptions of above recited embodiments, which will not be described again herein.

Referring to FIG., a structure of a device for communication based on LAA according to another embodiment of the present disclosure is illustrated.

Figure 5:
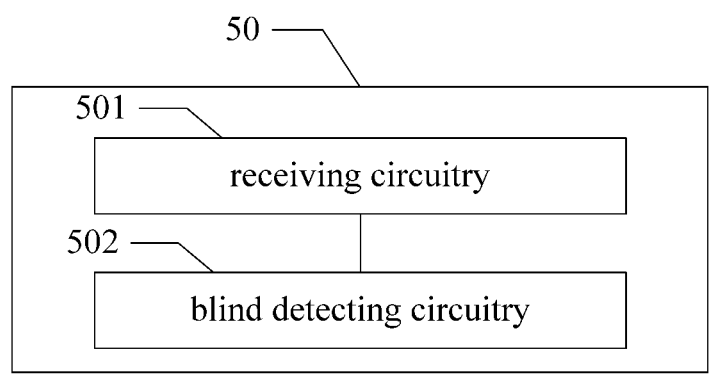
FIG. 5 schematically illustrates a structure of a device for communication based on LAA according to another embodiment of the present disclosure.

The device for communication based on LAA 50 as shown in FIG. 5 can be used on the terminal side. The device for communication based on LAA 50 may include: a receiving circuitry 501 and a blind detecting circuitry 502.

The receiving circuitry 501 is configured to receive cell group information from the base station, wherein the cell group information points to multiple carriers, and the multiple carriers include an un-licensed carrier and a licensed carrier.

The blind detecting circuitry 501 is configured to implement a blind detection to the multiple carriers based on the cell group information, so as to obtain downlink control information.

In some embodiments, the blind detecting circuitry 502 may include a determining sub-circuitry (not shown on FIG. 5) and a detecting sub-circuitry (not shown on FIG. 5).

The determining sub-circuitry is configured to determine a carrier being applied by the terminal a previous time for transmitting uplink data. The detecting sub-circuitry is configured to implement the blind detection to the carrier being determined, so as to obtain downlink control information. The detecting sub-circuitry is further configured to: when the downlink control information is not obtained after a preset period of time, implement the blind detection to other carriers other than the first carrier.

The device for communication based on LAA 50 may further include a data transmitting circuitry (not shown in FIG. 5). The data transmitting circuitry is configured to: when new data indication information is not reversed, re-transmit the data through a carrier of an uplink scheduling; and when the new data indication information is reversed, transmit new data through the carrier of the uplink scheduling.

In some embodiments, the cell group information may be received by one or more of the following ways: RRC signaling and a control element of a MAC.

Details of the present embodiment can refer to corresponding descriptions of above recited embodiments, which will not be described again herein.

One skilled in the art can understand that, all steps or some of the steps in various methods of above recited embodiments of the present disclosure can be accomplished by hardware under instruction of programs. The programs can be stored in a readable storage medium of a computer, wherein the storage medium may include: ROM (Read Only Memory), RAM (Random Access Memory), magnetic disk, light disk, etc.

Although the present disclosure has been disclosed above with reference to preferred embodiments thereof, it should be understood by those skilled in the art that various changes and modifications may be made without departing from the spirit or scope of the disclosure. Accordingly, the present disclosure covers changes and modifications made to the present disclosure that fall into scopes defined by the claims and equivalent technical solutions thereof.

The invention claimed is:

1. A method for communication based on LAA (License Assisted Access), comprising:
   transmitting cell group information to a terminal, where the cell group information comprises information associated with multiple carriers, and the multiple carriers comprise an un-licensed carrier and a licensed carrier; and
   transmitting downlink control information through an activated carrier in the multiple carriers, where the cell group information is used to instruct the terminal to implement a blind detection to the multiple carriers so as to obtain the downlink control information, wherein the terminal implementing the blind detection to the multiple carriers so as to obtain the downlink control information comprises: determining a carrier applied by the terminal for transmitting uplink data previously; and implementing a carrier detection to the carrier determined, so as to obtain the downlink control information,
   wherein the downlink control information comprises carrier indication information and new data indication information; and the carrier indication information comprises two carrier indexes which respectively point to a carrier corresponding to uplink HARQ (Hybrid Auto Repeat Request) feedback and a carrier of uplink scheduling.

2. The method for communication based on LAA according to claim 1, wherein transmitting downlink control information through an activated carrier in the multiple carriers comprises:
   continuously sensing the un-licensed carrier; and
   when the un-licensed carrier is sensed being idle, transmitting the downlink control information through the un-licensed carrier.

3. The method for communication based on LAA according to claim 1, wherein the terminal implements the blind detection to the multiple carriers so as to obtain the downlink control information further comprises:
   when the downlink control information is not obtained after a preset period of time, the terminal implementing the carrier detection to other carriers other than the carrier determined.

4. The method for communication based on LAA according to claim 1, wherein the cell group information instructs the terminal to implement the blind detection to the multiple carriers through a preset information element or preset instruction information comprised in the cell group information.

5. The method for communication based on LAA according to claim 1, wherein the cell group information is transmitted by one or more of following ways: RRC (Radio Resource Control) signaling and a control element of a MAC (Media Access Control).

6. A method for communication based on LAA (License Assisted Access), comprising:
   receiving cell group information from a base station, where the cell group information comprises information associated with multiple carriers, and the multiple carriers comprise an un-licensed carrier and a licensed carrier; and
   implementing a blind detection to the multiple carriers based on the cell group information so as to obtain downlink control information, wherein implementing the blind detection to the multiple carriers based on the cell group information so as to obtain the downlink control information comprises: determining a carrier applied by the terminal for transmitting uplink data previously; and implementing a carrier detection to the carrier determined, so as to obtain the downlink control information,
   wherein the downlink control information comprises carrier indication information and new data indication information; and the carrier indication information comprises two carrier indexes which respectively point to a carrier corresponding to uplink HARQ (Hybrid Auto Repeat Request) feedback and a carrier of uplink scheduling.

7. The method for communication based on LAA according to claim 6, wherein implementing the blind detection to the multiple carriers so as to obtain the downlink control information further comprises:
   when the downlink control information is not obtained after a preset period of time, implementing the carrier detection to other carriers other than the carrier determined.

8. The method for communication based on LAA according to claim 6, wherein implementing a carrier detection to the carrier being determined, so as to obtain the downlink control information further comprises:
   when the new data indication information is not reversed, re-transmitting the data through a carrier of an uplink scheduling; and
   when the new data indication information is reversed, transmitting new data through the carrier of the uplink scheduling.

9. The method for communication based on LAA according to claim 6, wherein the cell group information is transmitted by one or more of following ways: RRC (Radio Resource Control) signaling and a control element of a MAC (Media Access Control).

10. A device for communication based on LAA (License Assisted Access), comprising:
    a cell group information transmitting circuitry configured to: transmit cell group information to a terminal, wherein the cell group information comprises information associated with multiple carriers, and the multiple carriers comprise an un-licensed carrier and a licensed carrier; and
    a downlink control information transmitting circuitry configured to: transmit downlink control information through an activated carrier in the multiple carriers, wherein the cell group information is used to instruct the terminal to implement a blind detection to the multiple carriers so as to obtain the downlink control information, wherein the terminal implementing the blind detection to the multiple carriers so as to obtain the downlink control information comprises: determining a carrier applied by the terminal for transmitting uplink data previously; and implementing a carrier detection to the carrier determined, so as to obtain the downlink control information, wherein the downlink control information comprises carrier indication information and new data indication information; and the carrier indication information comprises two carrier indexes which respectively point to a carrier corresponding to uplink HARQ (Hybrid Auto Repeat Request) feedback and a carrier of uplink scheduling.

11. The device for communication based on LAA according to claim 10, wherein the downlink control information transmitting circuitry comprises:
   a sensing sub-circuitry configured to: continuously sense the un-licensed carrier; and
   a transmitting sub-circuitry configured to: when the un-licensed carrier is sensed being idle, transmit the downlink control information through the un-licensed carrier.

12. The device for communication based on LAA according to claim 10, wherein the cell group information instructs the terminal to implement the blind detection to the multiple carriers through a preset information element or preset instruction information comprised in the cell group information.

13. The device for communication based on LAA according to claim 10, wherein the cell group information is transmitted by one or more of following ways: RRC (Radio Resource Control) signaling and a control element of a MAC (Media Access Control).

14. A device for communication based on LAA (License Assisted Access), comprising:
   a receiving circuitry configured to: receive cell group information from a base station, wherein the cell group information comprises information associated with multiple carriers, and the multiple carriers comprise an un-licensed carrier and a licensed carrier; and
   a blind detecting circuitry configured to: implement a blind detection to the multiple carriers based on the cell group information so as to obtain downlink control information,
   wherein the blind detecting circuitry comprises: a determining sub-circuitry configured to: determine a carrier applied by the terminal for transmitting uplink data previously; and a detecting sub-circuitry configured to: implement a carrier detection to the carrier determined, so as to obtain the downlink control information,
   wherein the downlink control information comprises carrier indication information and new data indication information; and the carrier indication information comprises two carrier indexes which respectively point to a carrier corresponding to uplink HARQ (Hybrid Auto Repeat Request) feedback and a carrier of uplink scheduling.

15. The device for communication based on LAA according to claim 14, wherein when the downlink control information is not obtained after a preset period of time, the detecting sub-circuitry implements the carrier detection to other carriers other than the carrier determined.

16. The device for communication based on LAA according to claim 14, further comprising:
   a data transmitting circuitry configured to: when the new data indication information is not reversed, re-transmit the data through a carrier of an uplink scheduling; and when the new data indication information is reversed, transmit new data through the carrier of the uplink scheduling.

17. The device for communication based on LAA according to claim 14, wherein the cell group information is transmitted by one or more of following ways: RRC (Radio Resource Control) signaling and a control element of a MAC (Media Access Control).

18. The method for communication based on LAA according to claim 1, wherein if a value of the new data indication information is not reversed, it indicates that the terminal fails to transmit data through the carrier corresponding to the uplink HARQ feedback, and the data is retransmitted by the terminal through the carrier of uplink scheduling; and if the value of the new data indication information is reversed, it indicates that the terminal successfully transmits data through the carrier corresponding to the uplink HARQ feedback, and new data is transmitted through the carrier of uplink scheduling.

* * * * *